F. A. FROMMANN.
VEHICLE WHEEL.
APPLICATION FILED DEC. 9, 1912.
1,201,716.
Patented Oct. 17, 1916.
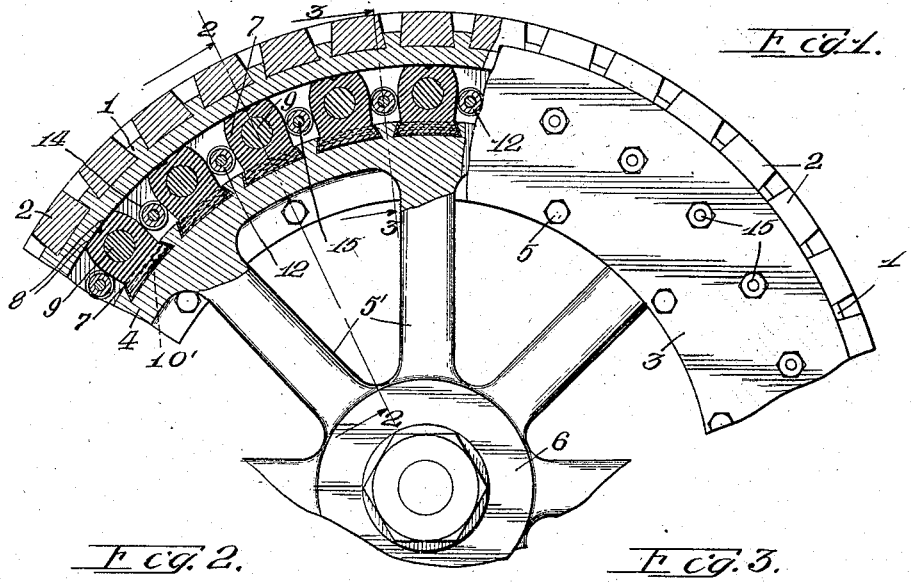
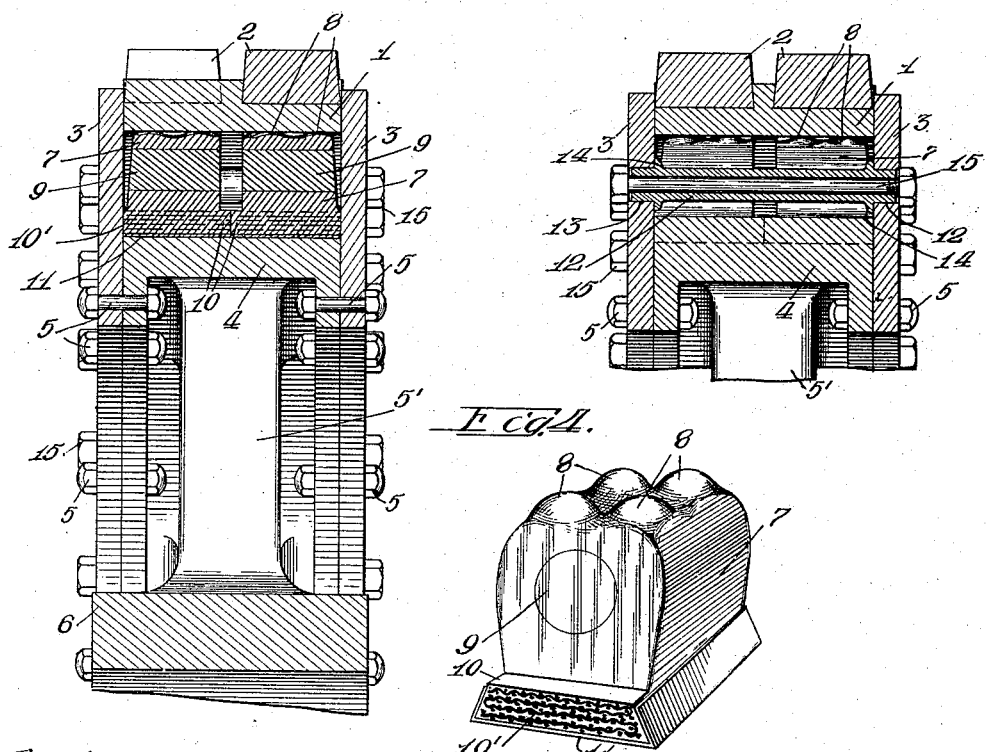
Witnesses:
Inventor:
Franklin A. Frommann
by Rudolph Jr.
Attorney.

UNITED STATES PATENT OFFICE.

FRANKLIN A. FROMMANN, OF CHICAGO, ILLINOIS, ASSIGNOR TO OLIVE FROMMANN, OF CHICAGO, ILLINOIS.

VEHICLE-WHEEL.

1,201,716.  Specification of Letters Patent.  Patented Oct. 17, 1916.

Application filed December 9, 1912. Serial No. 735,722.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to new and useful improvements in wheels and particularly to the class of wheels having a rigid tire construction movable with respect to the hub of the wheel, this tire being maintained in its normal concentric relation to the hub by a series of cushioning members mounted between the hub and the tire. Suitable tire or rim constructions for this purpose are shown in my copending applications filed Dec. 9, 1912, as Serial Numbers 735,723 and 735,721.

My present invention relates to a novel construction of the resilient members interposed between tires or rims of this general class and the hubs of the wheels upon which they are used.

The object of this invention is to provide such an intermediary resilient structure comprising a plurality of cushioning units, each of which may easily be removed or replaced; to construct such cushioning units with bases adapted to interlock securely with corresponding formations upon the hub rim or felly of the wheel, and also adapted to hold the cushions in effective positions laterally of the wheel; also to so construct these cushioning units as to permit of their having great compressibility and resiliency while still providing them with the toughness of exterior requisite for withstanding the strains upon them.

A further object of my invention is to provide bumpers interposed between the cushioning elements for limiting the distension of these cushions circumferentially of the wheel.

Still another object of my invention is to utilize these bumpers as braces between the side plates of the wheel, whereby the wheel is stiffened and the side flanges are spaced at the requisite distance from each other for properly guiding the tire.

Other objects will be apparent from the following specification and from the accompanying drawings in which:

Figure —1— shows a fragmentary side view of a wheel embodying my invention, parts of the same being shown in section. Fig. —2— shows a section through Fig. —1— along the line 2—2. Fig. —3— shows a section through Fig. —1— along the line 3—3. Fig. —4— shows an enlarged perspective of one of the cushioning elements.

In employing my invention, I preferably use a tire construction comprising a substantially inflexible tire 1 having upon its circumference a large number of grooves for holding tread blocks 2 of wood or other suitable materials. This tire 1 is guided laterally of the wheel by side plates or flanges 3 fastened to opposite sides of a rim or felly 4 by bolts 5. The rim or felly 4, together with the spokes 5' supporting the same, are preferably cast integral with the hub 6 of the wheel. Upon the circumferential face of the rim or felly 4 I provide grooves extending transversely across the said face of the rim or felly and preferably dovetail shaped in section. Into each of these grooves I slide the correspondingly shaped base of a cushioning member 7, which member is adapted to project above the face of the rim or felly 4 to a height corresponding approximately to the radial distance between the rim 4 and the inner face of the tire 1.

The cushion 7 preferably is made of vulcanized rubber and provided at its top with a plurality of dome-shaped projections 8 adapted to bear at their tips against the tire 1. Each cushion 7 also is preferably made with a core 9 of softer and more easily distorted material than the rest of the cushion and with an extension 10 upon its base portion, which extension serves to space the cushions transversely of the rim or felly portion of the hub with which they have interlocking engagement. The entire dovetail shaped base of the cushioning member preferably has a series of layers of textile or wire cloth fabric 10 embedded in the same, whereby the base portion is stiffened so that it will not be twisted or wrenched out of the groove which retains it, in case the cushion is severely flexed. As a further safeguard against such a possible loosening of the cushions from the grooves in the rim or felly 4, I preferably provide the base of each cushion with a binding 11 of steel or other sheet metal. In positioning the cushions 7 upon the rim or felly 4, they are not so closely spaced that the cushions will bear against one another when distended circumferentially of the wheel, but the grooves in the rim or felly 4 are so widely separated as to allow considerable space between the adjacent cushions 7. In each of these spaces I position a bumper member 12 consisting of a steel tube extending transversely of the wheel and fitting at its ends into perforations 13 in the side flanges 3 of the wheel. The bumper tube 12 has an enlarged flange 14 near each end, adapted to bear against the respective inner faces of the side plates 3 of the wheel, the portions of the bumper tube extending beyond the flanges 14 being shorter than the thickness of the side plates 3. Bolts 15 extending through the tubes 12 enable the side plates to be drawn up tightly against the flanges on the tubes, thereby uniting the tubes and side plates into a single rigid structure, which in turn is rigidly secured to the body of the wheel by the bolts 5.

When pressure is exerted upon any point of the tire tending to move the same toward the wheel body, the cushions in proximity to this portion of the tire will be compressed radially of the wheel and distended circumferentially of the latter, but in doing so they will engage the adjacent bumper tubes which will maintain the cushions in a substantially radial position. Otherwise, the tire in slipping or creeping circumferentially with respect to the cushions might tend to carry the tips of the cushions with it; and if this circumferential strain upon the cushions were not checked, it might distort the cushions beyond the limit of their normal resiliency. By interposing the bumper members 12 I obviate any chance of such an overstraining of the cushions while still permitting the latter to be greatly distended and to be flexed circumferentially of the wheel to a limited extent, whereby the strains upon the tire may be transmitted to a large number of the cushioning elements, while the tire itself may slip or creep over the tips of the cushions until checked by the friction between the tire and these cushions. It will be obvious from the drawings that when there is no strain on the wheel, every cushion will abut against the inner surface of the tire only at the tips of the dome-shaped projections upon the cushion; but that these tips will be flattened by any centripetal pressure, thereby causing them to present a greater surface to the tire. Consequently, the friction between the cushioning members and the tire will increase rapidly with an increase of the pressure tending to move the tire from a position concentric of the hub.

Having thus shown and described my invention in an embodiment capable of being modified in manifold ways without departing from the spirit of my invention, what I claim as new and desire to cover by Letters Patent is:

1. In a wheel, a felly provided with transverse peripheral grooves extending entirely across said felly at regular intervals, each groove having a contracted mouth portion, cushions each having a reinforced metal covered base adapted to fit within said grooves, side plates for said felly projecting beyond the periphery thereof, retaining said cushions in said grooves, and a tire mounted between said side plates and upon said cushions and spacing members joining said side plates and interposed between adjacent cushions.

2. In a wheel, a felly provided with transverse peripheral grooves at regular intervals, each groove having a contracted mouth portion, cushions each having a reinforced metal covered base adapted to fit within said grooves, side plates for said felly projecting beyond the periphery thereof, and retaining said cushions in said grooves, a tire slidably mounted upon said cushions between said side plates and maintained by said cushions normally concentric with said felly, the depth of said cushions being greater than the normal width of the annular space between said felly and said tire and spacers carried by said side plates and interposed between adjacent cushions.

3. In a wheel, a felly provided with transverse peripheral grooves at regular intervals, each groove having a contracted mouth portion, cushions each having a reinforced metal covered base adapted to fit within said grooves, side plates for said felly projecting beyond the periphery thereof and retaining said cushions in said grooves, separator sleeves secured at their ends to said side plates and passing between said cushions, and a tire movably disposed between said side plates and upon said cushions.

4. In a wheel, a felly provided with transverse peripheral grooves at regular intervals, each groove having a contracted mouth portion, a pair of cushions each having a reinforced base mounted in each groove, each base of each cushion being of greater width than its crown portion and maintaining an open space between the crown portions thereof, a tire movably mounted upon said cushions, and side plates on the felly engaging the side edges of said tire and holding the latter and said cushions in place relatively to the felly, there being a free space between the crown portion of each cushion and the contiguous side plate and relatively rigid spacers interposed circumferentially between adjacent cushions.

5. In a wheel, a felly provided with transverse peripheral grooves at regular intervals, each groove having a contracted mouth portion, a pair of cushions each having a reinforced base mounted in each groove, each base of each cushion being of greater width than its crown portion and maintaining an open space between the crown portions thereof, a tire movably mounted upon said cushions, and side plates on the felly engaging the side edges of said tire and holding the latter and said cushions in place relatively to the felly, there being a free space between the crown portion of each cushion and the contiguous side plate, and separator sleeves secured at their ends to said side plates and passing through the spaces between the crown portions and contiguous pairs of cushions.

6. In a wheel, a felly, a tire, and a plurality of cushioning members interposed therebetween and spaced apart, each of the said cushioning members having interlocking engagement with the felly; side plates carried by the felly, and bumpers carried by the said side plates and interposed circumferentially between the cushioning members, said bumpers resisting tipping of said cushioning members into the free space bordering the same.

7. In a wheel, a felly, a tire, and a plurality of cushioning members interposed therebetween spaced apart, each of the said cushioning members having interlocking engagement with the felly; side plates carried by the felly, and bumpers carried by the said side plates and interposed circumferentially between the cushioning members, the said bumpers serving as spacers for keeping the side plates at a predetermined distance from each other, each of said bumpers occupying the full width of the space between two contiguous cushions and affording supports for said cushions to prevent excessive deflection thereof circumferentially of the wheel.

In testimony whereof I have signed my name in presence of two subscribing witnesses.

FRANKLIN A. FROMMANN.

Witnesses:
RUDOLPH WM. LOTZ,
M. M. BOYLE.

Copies of this patent may be obtained for five cents each, by addressing the "Commissioner of Patents, Washington, D. C."